United States Patent
Sarkar et al.

(10) Patent No.: US 8,055,266 B1
(45) Date of Patent: Nov. 8, 2011

(54) SYSTEM AND METHOD FOR REDUCING INTERFERENCE AND NOISE TO IMPROVE WIRELESS COMMUNICATIONS

(75) Inventors: Debasish Sarkar, Irvine, CA (US); Sachin R. Vargantwar, Overland Park, KS (US); Siddharth S. Oroskar, Overland Park, KS (US); Deveshkumar N. Rai, Overland Park, KS (US); Manoj Shetty, Overland Park, KS (US)

(73) Assignee: Sprint Spectrum L.P., Overland Park ( * ) Notice: Subject to any disclaimer, the term of this patent is extended or adjusted under 35 U.S.C. 154(b) by 697 days.

(21) Appl. No.: 12/198,739

(22) Filed: Aug. 26, 2008

(51) Int. Cl.
H04W 72/00 (2009.01)

(52) U.S. Cl. .................. 455/452.1; 455/550.1; 455/560; 455/561; 370/328; 370/329

(58) Field of Classification Search .................. 455/450, 455/452.1, 452.2, 550.1, 560, 561; 370/328, 370/329
See application file for complete search history.

(56) References Cited

U.S. PATENT DOCUMENTS

| | | | |
|---|---|---|---|
| 6,731,947 B2 * | 5/2004 | Hoagland et al. | 455/517 |
| 6,891,812 B2 * | 5/2005 | Bender | 370/328 |
| 7,069,037 B2 | 6/2006 | Lott et al. | |
| 2003/0152044 A1 * | 8/2003 | Turner | 370/328 |
| 2004/0184514 A1 | 9/2004 | Heo et al. | |
| 2005/0136844 A1 | 6/2005 | Giesberts et al. | |
| 2005/0143027 A1 | 6/2005 | Hiddink et al. | |
| 2005/0220040 A1 | 10/2005 | Petrovic et al. | |
| 2006/0268878 A1 | 11/2006 | Jung et al. | |
| 2007/0041325 A1 | 2/2007 | Jung et al. | |
| 2007/0047494 A1 | 3/2007 | Cordone | |
| 2007/0091788 A1 | 4/2007 | Rajkotia et al. | |
| 2007/0133476 A1 | 6/2007 | Li et al. | |

OTHER PUBLICATIONS

Qualcomm, Inc., MSM6800 Chipset Solution, Mar. 2004.
Qualcomm, Inc., MSM6000 Chipset Solution, Feb. 2002.
Qualcomm, Inc., MSM6150 Chipset Solution, Aug. 2004.
Peng Li, EVDO QoS Roaming—for CDG IRT DIscussion, Nov. 2006.
Qualcomm, Inc., VoIP Overview, Sep. 2007.
Qualcomm, Inc., EV-DO Rev. A and B: Wireless Broadband for the Masses, Dec. 2007.
Airvana, Push-to-Talk (PTT) in an EV-DO Network, downloaded from the World Wide Web at http://www.airvanet.com/print/technology_pushtotalk.htm on Mar. 12, 2008.
Hidehiko Ohyane and Kenji Fukazawa, Development of HSDPA Radio Network, downloaded from the World Wide Web at https://www.ntt-review.jp/archive/ntttechnical.php?contents=ntr200704sf4.html on Aug. 13, 2008.

(Continued)

*Primary Examiner* — Nick Corsaro
*Assistant Examiner* — Vladimir Magloire

(57) ABSTRACT

A method and system for monitoring data rate requests (DRRs) transmitted from an access terminal (AT) to an access network (AN). Each DRR includes a parameter indicating whether it is a null or non-null DRR. Upon the AT transitioning to a null-DRR state, the AT and AN determine an average parameter of a given number of DRRs and compare the average to a threshold. The AT selects a time duration based on the average and starts a timer. When the timer counts to the selected duration, the AT transitions from a mode in which the AT transmits data channel traffic and other traffic to a mode in which the AT prevents transmission of data channel traffic but allows transmission of other traffic. The AN compares the average to another threshold and determines whether it should transmit forward-link traffic channel data to the AT at a null or non-null data rate.

24 Claims, 6 Drawing Sheets

OTHER PUBLICATIONS

Vedat Eyuboglu, Push-to-Talk over 1xEV-DO, CDG Technology Forum on PTT, Jun. 30, 2004.

Radio Electronics.com, The basics of CDMA 2000 1xEV-DO, from the World Wide Web as archived on Sep. 30, 2007 at http://web.archive.org/web/*/http://www.radio-electronics.com/info/cellulartelecomms/evdo/ev-do.php.

CDG CDMA University, CDMA2000 1xEV-DO Rev A Parameters: Design and Analyis, Student Guide Book 2, Table of Contents and pp. 6-12 through 6-27.

Evolution-Data Optimized, downloaded from the World Wide Web at http://en.wikipedia.org/wiki/Evolution-Data_Optimized on Feb. 28, 2008.

* cited by examiner

SYSTEM AND METHOD FOR REDUCING INTERFERENCE AND NOISE TO IMPROVE WIRELESS COMMUNICATIONS

BACKGROUND

Many people use access terminals, such as cell phones and personal digital assistants (PDAs), to communicate with wireless access networks, such as cellular wireless networks. These access terminals and access networks typically communicate with each other over a radio frequency (RF) air interface according to a wireless protocol such as Evolution Data Optimized (Ev-DO), perhaps in conformance with one or more industry specifications such as IS-856, Release 0 and IS-856, Revision A. Another protocol that may be used is known as Code Division Multiple Access (CDMA), perhaps in conformance with one or more industry specifications such as IS-2000. Other protocols may be used as well, such as Global System for Mobile Communications (GSM), Time Division Multiple Access (TDMA), and/or any others.

Access networks typically provide services such as voice, Short Message Service (SMS) messaging, and packet-data communication, among others, and typically include a plurality of base stations, each of which provide one or more coverage areas, such as cells and sectors (i.e., individual areas of a cell that allow the cell to carry more calls). When an access terminal is positioned in one of these coverage areas, it can communicate over the air interface with the base station, and in turn over one or more circuit-switched and/or packet-switched signaling and/or transport networks to which the base station provides access.

Access terminals and access networks may conduct communication sessions (e.g. voice calls and data sessions) over a pair of frequencies known as carriers, with a base station of an access network transmitting to an access terminal on one of the frequencies, and the access terminal transmitting to the base station on the other. This is known as frequency division duplex (FDD). A base-station-to-access-terminal link is known as the forward link, while a access-terminal-to-base-station link is known as the reverse link. Each base station may transmit pilot signals to the access terminals via the forward link. The access terminals may use the pilot signals to determine which base station(s) to conduct the communication sessions.

In accordance with some wireless protocols, such as EvDO, each access terminal measures the signal-to-interference-and-noise-ratio (SINR) of the pilot signals received at that access terminal so as to determine a data rate at which it should receive data from the access network. In turn, these access terminals transmit to the access network data rate requests that indicate the determined data rate. The access network then transmits data to each access terminal at the data rate requested by that access terminal. Since SINR measurements of pilot signals may be used to determine data rates at which an access terminal will receive data from the access network, changes in interference and/or noise received and/or occurring at that access terminal may affect the data rate requested by that access terminal and, in turn, the rate at which that access terminal receives data via the forward-link.

OVERVIEW

One way to reduce interference and/or noise received and/or occurring at access terminals carrying out communications with an access network is to prevent other access terminals from transmitting data to the access network via the reverse-link and/or to prevent the access network from transmitting data to the other access terminals via the forward-link. However, preventing the other access terminals from transmitting data and/or preventing the access network from transmitting data to the other access terminals may be desirable only under particular conditions, such as when the other access terminals are unable to decode data transmitted from the access network and when it is more likely than not that these conditions will not improve within a given period of time. The other access terminals, when experiencing poor RF conditions, may transmit a null data rate request to notify the access network that they are unable to decode the transmitted data. A respective average, of the requested data rates sent by each access terminal, may be used to determine whether the particular conditions will improve within the given period of time such that the other access terminals may continue carrying out communications via the access network.

In one respect, an exemplary embodiment may be arranged as a method carried out at an access terminal. The access terminal includes a timer and transmits data rate requests. Each of the data rate requests may include a data rate parameter that indicates whether the data rate request is a null data rate request or a non-null data rate request. The exemplary method includes (i) the access terminal transitioning to a null data rate request state, (ii) the access terminal determining an average of the data rate parameter of a given number of non-null data rate requests, (iii) in response to the access terminal transitioning to the null data rate request state, the access terminal selecting a time duration based on the determined average and starting the timer, and (iv) upon the timer counting an amount of time equal to the selected time duration, the access terminal transitioning from a first reverse traffic channel mode to a second reverse traffic channel mode.

While operating in the first reverse traffic channel mode, the access terminal allows transmission of reverse-link traffic channel data and other reverse-link traffic. While operating in the second reverse traffic channel mode, the access terminal prevents transmission of the reverse-link traffic channel data but allows transmission of the other reverse-link traffic. In accordance with this exemplary method, each non-null data rate request of the given number of non-null data rate requests is transmitted from the access terminal prior to the access terminal transitioning to the null data rate request state.

In another respect, an exemplary embodiment may be arranged as an access terminal that comprises a timer, a processor, data storage containing computer-readable program instructions that are executable by the processor, and a transmitter that transmits data rate requests. Each of the data rate requests may include a data rate parameter that indicates whether the data rate request is a null data rate request or a non-null data rate request. The program instructions include instructions that cause the access terminal to (i) transition to a null data rate request state, (ii) determine an average of the data rate parameter of a given number of non-null data rate requests, (iii) in response to transitioning to the null data rate request state, select a time duration based on the determined average and start the timer, and (iv) upon the timer counting an amount of time equal to the selected time duration, transition from the first reverse traffic channel mode to the second reverse traffic channel mode. In accordance with this exemplary embodiment, each of the non-null data rate requests of the given number of non-null data rate requests is transmitted from the access terminal prior to the access terminal transitioning to the null data rate request state.

In yet another respect, an exemplary embodiment may be arranged as a method carried out at an access network. The access network receives data rate requests and reverse-link traffic channel data from a given access terminal. Each of the received data rate requests may include a data rate parameter that indicates whether the data rate request is a null data rate request or a non-null data rate request. The access network is operable in (i) a first mode in which, in response to receiving a null data rate request from the given access terminal, the access network allows transmission of forward-link traffic channel data to the given access terminal at a non-null data rate, and (ii) a second mode in which, in response to receiving a null data rate request from the given access terminal, the access network prevents transmission of forward-link traffic channel data to the given access terminal. The exemplary method includes (i) the access network maintaining data that defines a data rate parameter threshold, and (ii) the access network determining whether a given application that is executing at the given access terminal is a first type of application, such as an application for carrying out voice communication sessions.

If the access network determines that the given application is the first type of application, then the method further includes the access terminal transitioning to operate in the first mode. Otherwise, if the access network determines that the given application is not the first type of application, then the method further includes (i) the access network receiving a null data rate request from the given access terminal, (ii) the access network determining an average of the data rate parameter of a given number of non-null data rate requests, and (iii) in response to the access network receiving the null data rate request, the access network determining whether the determined average equals or exceeds the data rate parameter threshold maintained by the access terminal. If the access network determines that the determined average equals or exceeds the data rate parameter threshold, then the access terminal responsively transitions to operate in the first mode. If the access network determines that the determined average does not equal or exceed the data rate parameter threshold, then the access terminal responsively transitions to operate in the second mode. Each of the non-null data rate requests of the given number of non-null data rate requests is received at the access network from the given access terminal prior to the access network receiving the null data rate request.

In still yet another respect, an exemplary embodiment is arranged as an access network that receives data rate requests and reverse-link data channel traffic from a given access terminal. Each of the received data rate requests may include a data rate parameter that indicates whether the data rate request is a null data rate request or a non-null data rate request. The access network is operable in (i) a first mode in which, in response to receiving a null data rate request from the given access terminal, the access network allows transmission of forward-link traffic channel data to the given access terminal at a non-null data rate, and (ii) a second mode in which, in response to receiving a null data rate request from the given access terminal, the access network prevents transmission of forward-link traffic channel data to the given access terminal.

The access network comprises a processor and data storage. The data storage contains data that defines a data rate parameter threshold, and computer-readable program instructions that are executable by the processor. The program instructions include (i) instructions that cause the processor to determine whether an application being executed at the given access terminal is a first type of application, (ii) instructions that cause the processor to determine an average of the data parameter of a given number of non-null data rate requests, wherein each non-null data rate request of the given number of non-null data rate requests is received at the access network from the given access terminal prior to reception of a given null data rate request that is transmitted to the access network from the given access terminal, (iii) a first set of transition instructions that cause the access network to transition to operate in the first mode, and (iv) a second set of transition instructions that cause the access network to transition to operate in the second mode.

If the processor determines that the application is the first type of application, then the processor executes the first set of transition instructions so as to cause the access terminal to operate in the first mode. If the processor determines that the application is not the first type of application, then after the access network's reception of the given null data rate request, the processor executes program instructions to determine whether the determined average equals or exceeds the data rate parameter threshold.

If the processor determines that the determined average equals or exceeds the data rate parameter threshold, then the processor responsively executes the first set of transition instructions so as to cause the access network to transition to operate in the first mode. If the processor determines that the determined average does not equal or exceed the data rate parameter threshold, then the processor responsively executes the second set of transition instructions so as to cause the access network to transition to operate in the second mode.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

Figure 1:
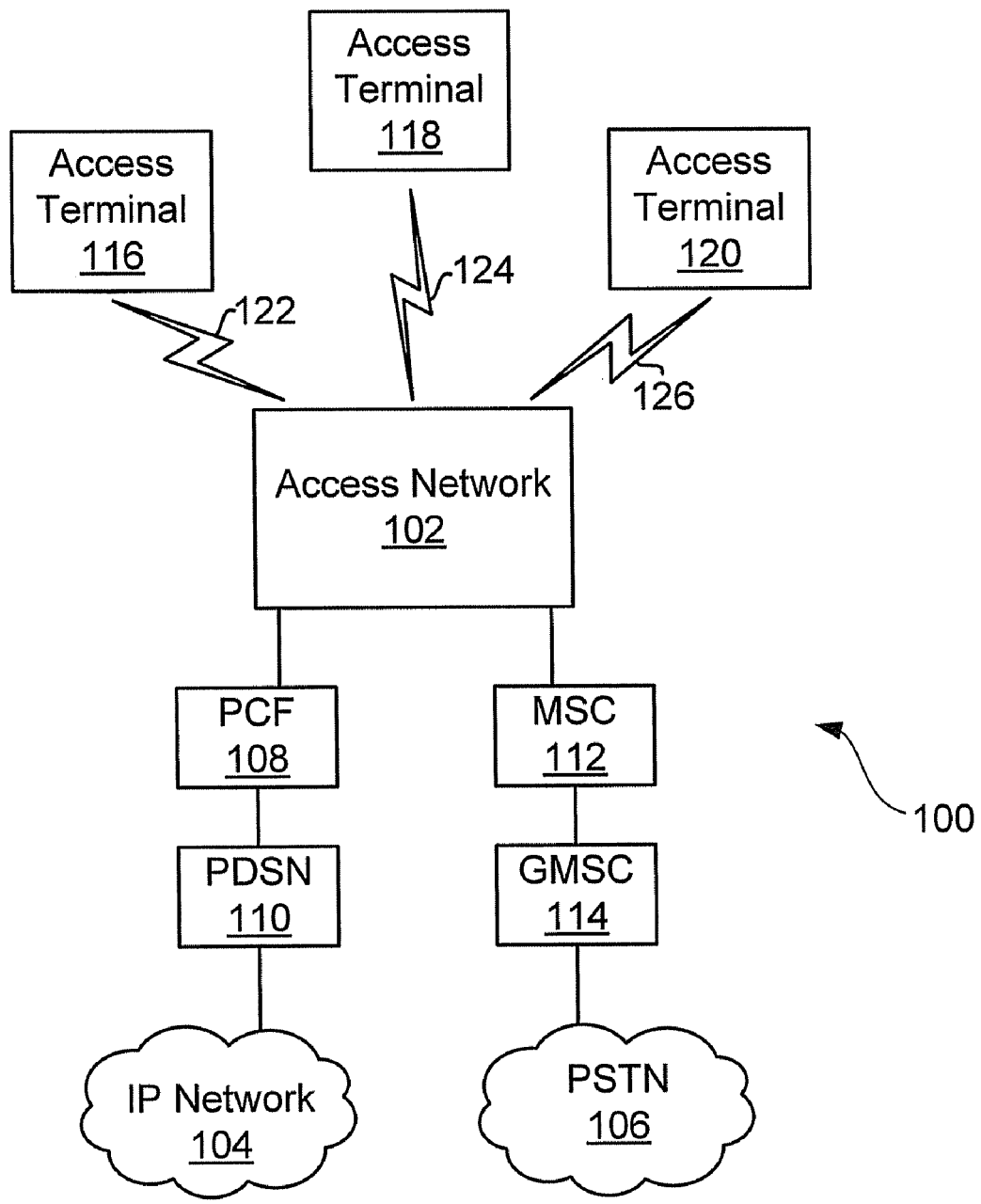
FIG. 1 is a block diagram of a network architecture in which an exemplary embodiment may be implemented.

Reference numerals are shown in the drawings to identify various elements of the drawings.

DETAILED DESCRIPTION

1. Introduction

Exemplary systems and methods are described herein. The exemplary systems and methods provide ways to reduce noise and/or interference being received and/or occurring at access terminals that are communicating with and/or via an access network. Reducing the noise and/or interference may include preventing the access network from transmitting forward-link traffic channel data to one or more other access terminals when the other access terminals are unable to decode packets (e.g., packets containing the forward-link traffic channel data) received from the access network and when it is unlikely that poor RF conditions being experienced by the access terminals will improve within a given period of time. Preventing the noise and/or interference may include preventing the other access terminals from transmitting reverse-link traffic channel data to the access network.

2. Exemplary Architecture

FIG. 1 is a block diagram of a network architecture 100 in which exemplary embodiments may be carried out. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

Network architecture 100 includes an access network 102, an Internet protocol (IP) network 104, and a public switched telephone network (PSTN) 106. One or more access terminals, such as access terminals 116, 118, 120, may communicate with access network 102. Access terminals 116, 118, 120 communicate with access network 102 via RF air interfaces, 122, 124, 126, respectively. As an example, RF air interfaces 122, 124, 126 may each comprise an air interface in accordance with an Ev-DO wireless protocol, a CDMA wireless protocol, or another wireless protocol.

Access network 102 comprises one or more base stations that communicate with access terminals 116, 118, 120 via air interfaces 122, 124, 126. IP network 104 comprises a packet-switched network that carries traffic arranged according to a packet-switching protocol, such as the Transmission-Control-Protocol/Internet-Protocol (TCP/IP). PSTN 106 comprises a circuit-switched network that establishes a dedicated circuit for carrying out each communication session (e.g., a telephone call) set up via PSTN 106. IP network 104 and PSTN 106 may each comprise a variety of communication devices (e.g., telephones and desktop computers) that carry out communication sessions with access terminals 116, 118, 120 and/or with each other.

A packet control function (PCF) 108 and a packet data serving node (PDSN) 110 provide a communication path between access network 102 and IP network 104. Functions carried out by PCF 108 may include managing the transmission of packets between the base station(s) of access network 102 and PDSN 110. Functions carried out by PDSN 110 may include managing the establishment, maintenance, and termination of point-to-point protocol (PPP) data sessions for access terminals 116, 118, 120.

A mobile switching center (MSC) 112 and a gateway mobile switching center (GMSC) 114 provide a communication path between access network 102 and PSTN 106. MSC 112 is a switch that connects access network 102 to GMSC 114 and, in turn, to PSTN 106. GMSC 114 terminates traffic and signals of PSTN 106 and converts the traffic and signals into a format used within MSC 112 and/or access network 102. Similarly, GMSC 114 terminates traffic and signals of access network 102 and/or MSC 112 and converts the traffic and signals into a format used within PSTN 106. GMSC 114 may be co-located with MSC 112 and/or may connect to one or more other MSCs.

Figure 2:
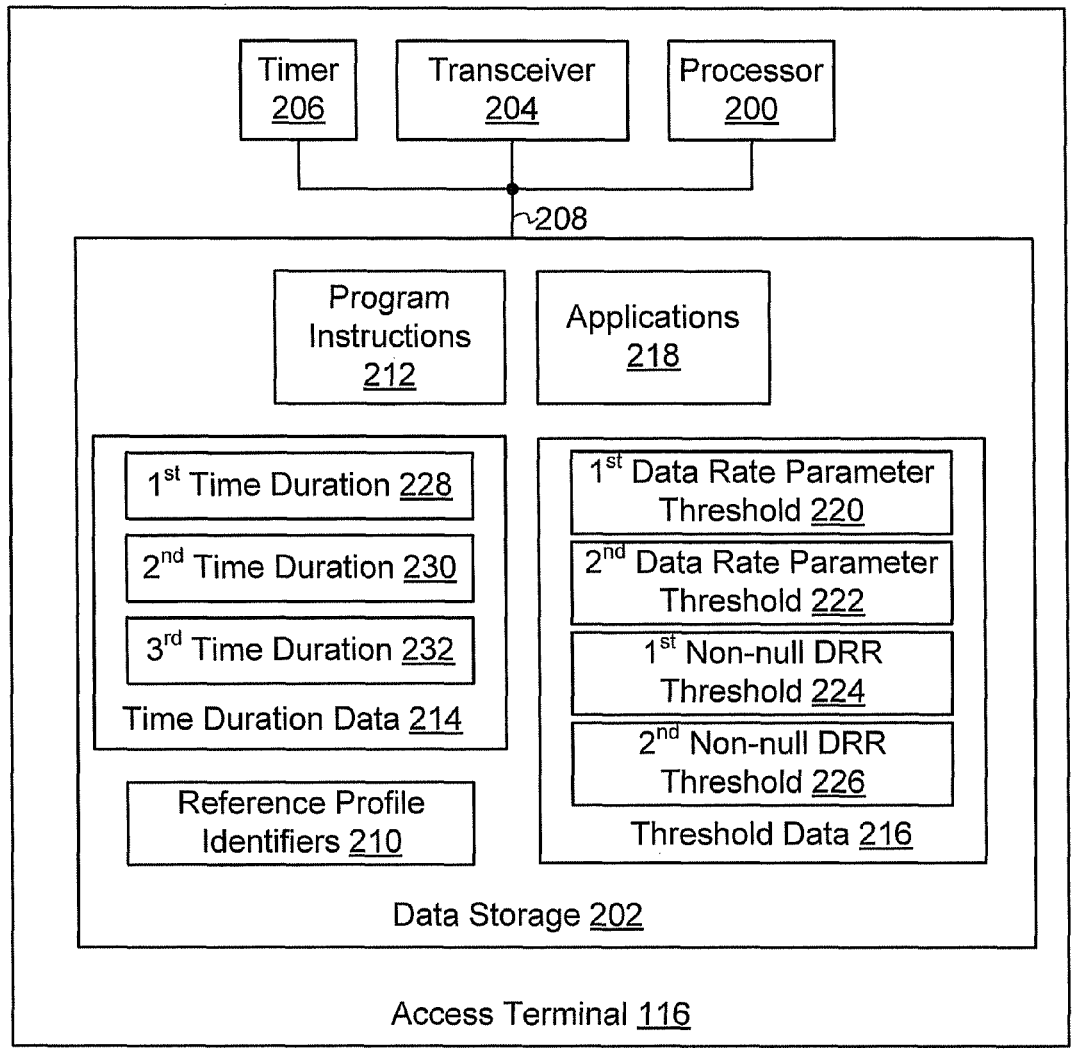
FIG. 2 is a block diagram of an exemplary access terminal.

Next, FIG. 2 is a block diagram of access terminal 116. As illustrated in FIG. 2, access terminal 116 includes a processor 200, data storage 202, a transceiver 204, and a timer 206, all linked together via a system bus, network, or other connection mechanism 208. Access terminals 118, 120, as well as one or more other access terminals, may be arranged in a configuration similar to access terminal 116.

Processor 200 may comprise one or more general purpose processors (e.g., INTEL microprocessors) and/or one or more special purpose processors (e.g., digital signal processors). Processor 200 may execute computer-readable program instructions 212 so as to carry out various functions described in this description and/or to cause data storage 202, transceiver 204, and/or timer 206 to carry out various functions described in this description.

Data storage 202 comprises a computer-readable storage medium readable by processor 200. The computer-readable storage medium may comprise volatile and/or non-volatile storage components, such as optical, magnetic, organic or other memory or disc storage, which can be integrated in whole or in part with processor 202. Data storage 202 contains computer-readable program instructions 212, time duration data 214, threshold data 216, and applications 218. Data storage 202 may contain other data in addition to the data illustrated in FIG. 2. Examples of the data contained at data storage 202 are provided below.

Transceiver 204 may comprise a transmitter operable to transmit traffic, such as reverse channel traffic and access channel traffic to access network 102 via a reverse-link of RF air interface 122, and a receiver operable to receive traffic, such as forward channel traffic from access network 102 via a forward-link of RF air interface 122. Additionally or alternatively, transceiver 204 may comprise a chipset, such as an MSM6800™ chipset manufactured by Qualcomm Incorporated of San Diego, Calif., and/or one or more other chipsets.

Transceiver 204 may transmit data rate requests to access network 102. Each data rate request may include a parameter that indicates whether the data rate request is a null data rate request or a non-null data rate request. In Table 1, each row of the left-most column defines a respective data rate parameter and each row of the right-most column defines whether the data rate parameter of that row is a null data rate parameter or a non-null data rate parameter. The data rate parameters of Table 1 may be encoded in an ASCII format or another format prior to transmission of the data rate parameters.

TABLE 1

| Data Rate Parameter | Data Rate in kbps | Slots Scheduled | Payload size (bits) | Null Data Rate or Non-Null Data Rate |
|---|---|---|---|---|
| 0 | 0 | 0 | 0 | Null Data Rate |
| 1 | 38.4 | 16 | 1024 | Non-Null Data Rate |
| 2 | 76.8 | 8 | 1024 | Non-Null Data Rate |
| 3 | 153.6 | 4 | 1024 | Non-Null Data Rate |
| 4 | 307.2 | 2 | 1024 | Non-Null Data Rate |
| 5 | 307.2 | 4 | 2048 | Non-Null Data Rate |
| 6 | 614.4 | 1 | 1024 | Non-Null Data Rate |
| 7 | 614.4 | 2 | 2048 | Non-Null Data Rate |
| 8 | 921.6 | 2 | 3072 | Non-Null Data Rate |
| 9 | 1228.8 | 1 | 2048 | Non-Null Data Rate |
| 10 | 1228.8 | 2 | 4096 | Non-Null Data Rate |
| 11 | 1843.2 | 1 | 3072 | Non-Null Data Rate |
| 12 | 2457.6 | 1 | 4096 | Non-Null Data Rate |

Threshold data 216 comprises data defining data rate parameter thresholds 220, 222, and non-null data rate request (DDR) thresholds 224, 226. Threshold data 216 may be contained within program instructions 212. Preferably, data rate parameter thresholds 220, 222 are different, and each of the data rate parameter thresholds 220, 222 is greater than zero (0) and less than or equal to the greatest data rate parameter that may be transmitted by access terminal 116. In this regard and based on the exemplary data rate parameters shown in Table 1, data rate parameter thresholds 220, 222 are each within a range of 1 to 12, and one of the data rate parameters thresholds may be 1 while the other may be 12. As an example, data rate parameter threshold 220 is five (5) and data rate parameter threshold 222 is two (2). Other examples of data rate parameter thresholds 220, 222 are possible. Examples of using data rate parameter thresholds 220, 222 are explained below. In an alternative embodiment, threshold data 216 may include a quantity of data rate parameter thresholds other than two.

Defining data rate parameter thresholds 220, 222 may be based on a probability that, within a given amount of time, access terminal 116 will experience a change from relatively poor RF conditions, under which access terminal 116 cannot decode data packets received from access network 102, to experiencing relatively good RF conditions, under which access terminal 116 can decode the received data packets. As an example, a wireless service provider may determine that if an average data rate parameter, of a number of data rate requests sent by access terminal 116 prior to access terminal 116 sending a null data rate request, is 2, then there is a 50% chance that access terminal 116 will experience relatively good RF conditions within the given amount of time. As another example, the wireless service provider may determine that if an average data rate parameter, of a number of data rate requests sent by access terminal 116 prior to access terminal 116 sending a null data rate request, is 5, then there is a 80% chance that access terminal 116 will experience relatively good RF conditions within the given amount of time. Other examples of defining data rate parameter thresholds 220, 222 are also possible.

The data that defines each of the non-null data rate request thresholds 224, 226 may comprise a positive integer. As an example, non-null data rate request threshold 224 is five (5) and non-null data rate request threshold 226 is sixteen (16). Non-null data rate request thresholds 224, 226 may be identical. Other examples of non-null data rate request thresholds 224, 226 are possible, and examples of using non-null data rate request thresholds 224, 226 are provided below.

Time duration data 214 comprises data defining time durations 228, 230, 232. Preferably, each of the defined time durations 228, 230, 232 are different. As an example, the first time duration 228 is 480 microseconds (μs), the second time duration 230 is 360 μs, and the third time duration 232 is 240 μs. In this regard, and for purposes of this description, the first time duration is greater than the second time duration and the second time duration is greater than the third time duration. A person having ordinary skill in the art will understand that time duration data 214 may define other time durations as well, and that the defined values of time durations 228, 230, 232 may be different than those listed in the example above. Time duration data 214 may be contained within program instructions 212.

Program instructions 212 may comprise a variety of instructions that are executable by processor 202. Program instructions 212 may include a first set of instructions that cause access terminal 116 to transition to a null data rate request state. The first set of instructions may include instructions that cause processor 200 to detect when transceiver 204 should transmit a null data rate request and/or to detect when transceiver 204 transmits and/or has transmitted a null data rate request. As an example, processor 200 may detect that a null data rate request should be transmitted by and/or in response to determining that access terminal 116 cannot decode data packets received from access network 102. The first set of instructions may also include instructions that cause processor 200 to generate a null data rate request and to cause transceiver 204 to transmit the null data rate request.

Program instructions 212 may include a second set of instructions that cause access terminal 116 (in particular, e.g., processor 200) to determine an average of the data rate parameter of a given number of non-null data rate requests transmitted by transceiver 204. For purposes of this description, the "determined average" determined by access terminal 116 will be referred to as a "first determined average." Each non-null data rate request of the given number of data rate requests is transmitted from access terminal 116 prior to access terminal 116 transitioning to the null data rate request state. As an example, if the given number of non-null data rate requests equals non-null data rate request threshold 224 (e.g., 5), and if access terminal 116 transmits, consecutively, non-null data rate requests having data rate parameters 8, 8, 9, 5, 6, 4, 3, 1, and 1 prior to transmitting a null data rate request (e.g., data rate parameter 0), then execution of the program instructions to determine the first determined average causes processor 200 to determine the average of 6, 4, 3, 1, and 1, (e.g., (6+4+3+1+1)/5=5). In this regard, the first determined average is based on the non-null data requests transmitted just prior to transmission of the null data rate request.

Program instructions 212 may include a third set of instructions that cause access terminal 116 (in particular, e.g., processor 200) to select a time duration based on the determined average and to start timer 206. The third set of instructions may be executed in response to access terminal 116 transitioning to the null data rate request state.

As an example, in an embodiment in which time duration data 214 includes time durations 228, 230, but does not include time duration 232, and threshold data 216 includes data rate parameter threshold 220, but does not include threshold 222, the third set of instructions may include instructions that cause processor 200 to detect whether the first determined average equals or exceeds data rate parameter threshold 220. If processor 200 detects that the determined average equals or exceeds threshold 220, then selecting the time duration includes selecting the first time duration 228. On the other hand, if processor 200 detects that the first determined average does not equal or exceed threshold 220, then selecting the time duration includes selecting the second time duration 230.

As another example, in an embodiment in which time duration data 214 includes time durations 228, 230, 232 and threshold data 216 includes data rate parameter thresholds 220, 222 (e.g., 5 and 2 respectively), the third set of instructions may include instructions that cause processor 200 to detect whether the first determined average equals or exceeds data rate parameter threshold 220 and instructions to detect whether the first determined average equals or exceeds the data rate parameter threshold 222. If processor 200 detects that the first determined average equals or exceeds data rate parameter threshold 220, then selecting the time duration includes selecting the first time duration 228. If processor 200 detects that the first determined average does not equal or exceed data rate parameter threshold 220 and that the first determined average equals or exceeds data rate parameter threshold 222, then selecting the time duration includes selecting the second time duration 230. If processor 200 detects that the first determined average does not equal or exceed data rate parameter 222, then selecting the time duration includes selecting the third time duration 232.

Program instructions 212 may include a fourth set of instructions that cause access terminal 116 to transition from a first reverse traffic channel mode to a second reverse traffic channel mode. These instructions may be executed upon and/ or in response to timer 206 counting an amount of time equal to the selected time duration. Program instructions 212 may include instructions that cause access terminal 116 to operate in the first reverse traffic channel mode or to operate in the second reverse channel traffic mode. While operating in the first reverse traffic channel mode, access terminal 116 allows transceiver 204 to transmit reverse-link traffic channel data and other reverse-link traffic. While operating in the second reverse traffic channel mode, access terminal 116 prevents transceiver 204 from transmitting reverse-link traffic channel data, but allows transceiver 204 to transmit the other reverse-link traffic.

For purposes of this description "other reverse-link traffic" refers to reverse-link traffic, other than reverse-link traffic channel data (e.g., user traffic), that is to be transmitted, is currently being transmitted, and/or that was transmitted from access terminal 116 while access terminal 116 operates in a traffic channel mode. During the traffic channel mode, access terminal 116 may transmit user traffic or signaling information to access network 102. As an example, the other reverse-link traffic may include, but is not limited to, pilot channel traffic, medium access channel traffic, acknowledgment channel traffic, auxiliary pilot channel traffic, a reverse rate indicator (RRI), a data rate request, and data source control traffic.

Applications 218 may comprise computer-readable program instructions that are executable by processor 200. In this regard, program instructions 212 may include applications 218. Applications 218 may comprise various types of applications, such as a first type of application that allows a user of the access terminal 116 to carry out voice communication sessions, and a second type of application operable to carry out functions other than voice communication sessions. As an example, the first type of application may include a Voice over Internet Protocol (VoIP) application and/or a push-to-talk (PTT) application. As another example, the second type of application, a "best-effort" application, may comprise a web browsing application (e.g., an application that allows a user to browse web pages accessible via the World Wide Web and/or. the Internet), and/or a video streaming application, (e.g., an application that streams television programs to access terminal 116). Other examples of the first type of application and the second type of application are also possible.

Each application of applications 218 may be associated with a profile identifier. Some applications may be associated with multiple profile identifiers so as to identify a type of traffic that is generated by the application. Each of the profile identifiers may be stored at data storage 202 within reference profile identifiers 210. Reference profile identifiers 210 may contain data that indicates an application that is associated with each reference profile identifier. As an example, a best effort application may be associated with a profile ID of 0x0000 and a VoIP application may be associated with the profile IDs 0x0500 and 0x0100. In accordance with this example, the profile ID of 0x0500 may identify that data transmitted from access terminal 116 comprises reverse-link control channel signaling generated by a VoIP application, and the profile ID of 0x0100 may identify that data transmitted from access terminal 116 comprises reverse-link traffic channel data generated by a VoIP application. The preamble of each data packet received at access network 102 from access terminal 116 may include a profile identifier of the application that generated the packet of data comprised within the packet.

Program instructions 212 may include a fifth set of program instructions that cause processor 200 to determine whether an application being executed at access terminal 116 is a first type of application. These program instructions may cause processor 200 to compare a profile identifier transmitted by access terminal 116 to reference profile identifiers 210 stored at data storage 202. Upon matching the transmitted profile identifier to a reference profile identifier, processor 200 can determine the application associated with the transmitted profile identifier from reference profile identifiers 210. Other examples of processor 200 determining whether an application being executed at access terminal 116 is a first type of application are also possible.

Figure 3:
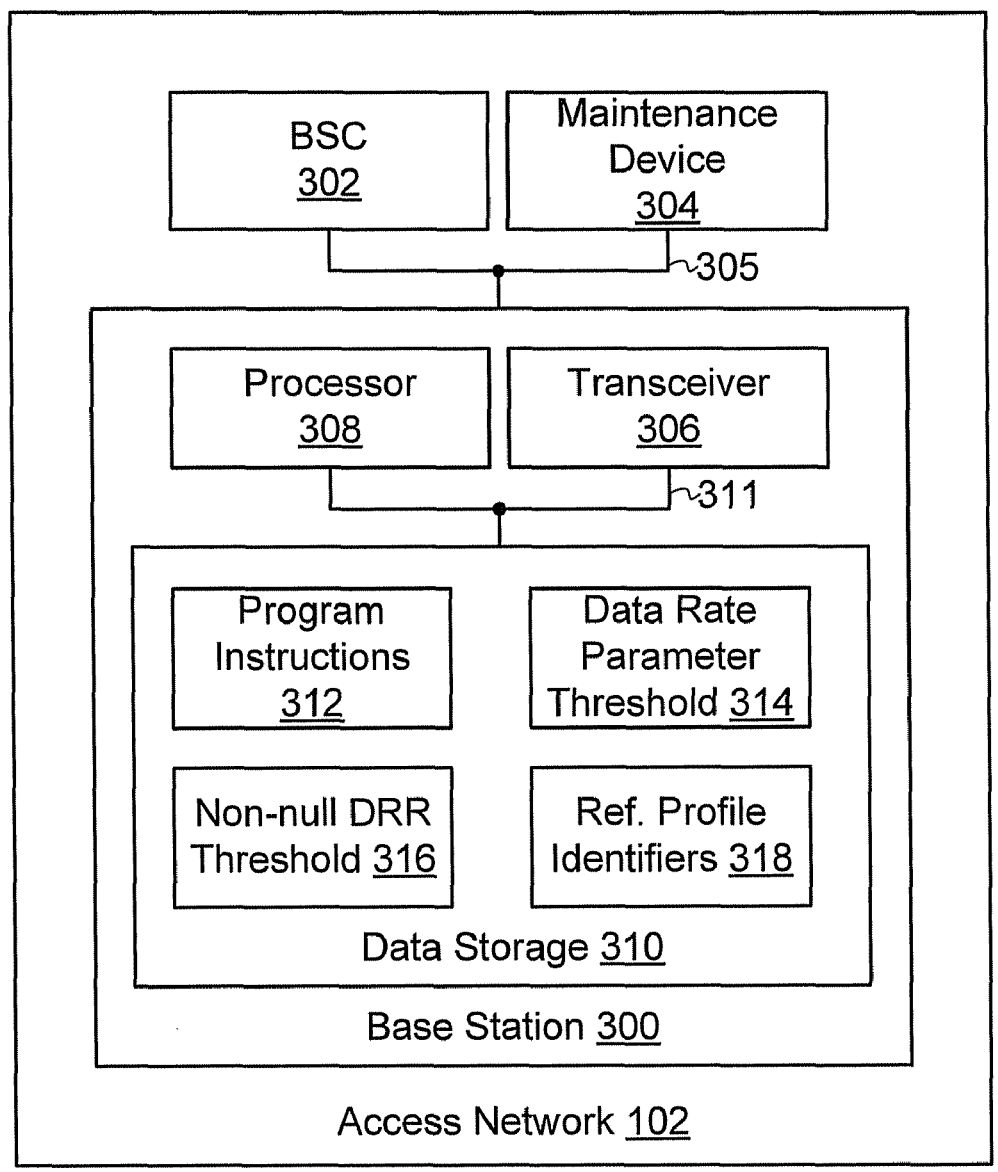
FIG. 3 is a block diagram of an exemplary access network.

Next, FIG. 3 is a block diagram of access network 102. Access network 102 may be operated by a wireless service provider, such as Sprint Nextel Corporation, Overland Park, Kans. As illustrated in FIG. 3, access network 102 includes a base station 300, a base station controller (BSC) 302, and maintenance device 304, all linked together via a system bus, network, or other connection mechanism 305. A person having ordinary skill in the art will understand that access network 102 may include one or more other devices (e.g., base stations, BSCs, and/or maintenance devices). These other devices are not shown for clarity of FIG. 3.

BSC 302 performs various functions such as managing base station 300 and one or more other base stations. The management functions carried out by BSC 302 may include allocating resources to access terminals 116, 118, 120 and handing off communication sessions from one base station to another base station. BSC 302 may communicate messages between various devices, such as between base station 300 and MSC 112 and between base station 300 and PCF 108. BSC 302 may be co-located with base station 300 and/or maintenance device 304.

Maintenance device 304 may comprise a desktop computer, a work station, and/or some other device or system that allows the wireless service provider to maintain access network 102. As an example, the wireless service provider may use maintenance device 304 to send requests to base station 300 to modify data contained at data storage 310. As another example, the wireless service provider may use maintenance device 304 to cause base station 300 to send requests to access terminal 116 to modify data contained at data storage 202.

Base station 300 includes a transceiver 306, a processor 308, and data storage 310, all linked together via a system bus, network, or other connection mechanism 311. In an alternative embodiment, transceiver 306, processor 308, and/or data storage 310 may be located remote from base station 300. Transceiver 306 may comprise a base transceiver station (BTS) having a transmitter for transmitting forward-link communications to access terminals 116, 118, 120 and a receiver for receiving reverse-link communications, such as data rate requests and reverse-link traffic channel data, from access terminals 116, 118, 120.

Processor 308 may comprise one or more general purpose processors and/or one or more special purpose processors. Processor 308 may execute computer-readable program instructions 312 so as to carry out various functions described in this description and/or to cause data storage 310 and transceiver 306 to carry out various functions described in this description.

Data storage 310 comprises a computer-readable storage medium readable by processor 308. The computer-readable storage medium may comprise volatile and/or non-volatile storage components, such as optical, magnetic, organic or other memory or disc storage, which can be integrated in whole or in part with processor 308. Data storage 310 contains computer-readable program instructions 312, and data that define a data rate parameter threshold 314, a non-null data rate request threshold 316, and reference profile identifiers 318. Data storage 310 may contain other types of data in addition to the data illustrated in FIG. 3.

Data rate parameter threshold 314 is greater than zero (0) and less than or equal to the greatest data rate parameter that may be transmitted by access terminal 116. In this regard and based on the exemplary data rate parameters shown in Table 1, the greatest data rate parameter may be 12. As an example, data rate parameter threshold 314 is 5. Examples of using data rate parameter threshold 314 are provided below, and other examples of data rate parameter threshold 314 are also possible.

Non-null data rate request threshold 316 may comprise a positive integer. As an example, non-null data rate request threshold 316 is five (5). Non-null data rate request thresholds 224, 316 may be identical. Base station 300 may receive from maintenance device 304 a request to modify non-null data rate request threshold 316, and processor 308 may cause threshold 316 to be modified according to the request. Examples of using non-null data rate request threshold 316 are provided below, and other examples of non-null data rate request threshold 316 are also possible.

Reference profile identifiers 318 contain data usable by processor 308 to compare to profile identifiers received from access terminals 116, 118, 120 so as to determine the type of application that generated the received profile identifiers and/ or the type of data stream that contained the received profile identifiers. As an example, reference profile identifiers 318 may comprise a reference profile identifier of 0×0000 to identify an application as a best effort application and/or a data stream that was generated by a best effort application. As another example, reference profile identifiers 318 may comprise a reference profile identifier of 0×0500 or 0×0100 to identify an application as a VoIP application and/or a data stream as a particular type of data stream generated by the VoIP application. The particular types of data streams may, for example, include a user traffic data stream or a signaling data stream. Other examples of reference profile identifiers 318 are also possible.

Program instructions 312 may comprise a variety of instructions that are executable by processor 308. Program instructions 312 may include a sixth set of program instructions that cause access network 102 to operate in a first mode for one or more access terminals, and a seventh set of program instructions that cause access network 102 to operate in a second mode for the one or more access terminals. While operating in the first mode for a given access terminal (e.g., access terminal 116), access network 102 allows transmission of forward-link traffic channel data to the given access terminal at a non-null data rate (e.g., a data rate greater than or equal to 38.4 kbps). While operating in the second mode for the given access terminal, access network 102 prevents transmission of forward-link traffic channel data to the given access terminal. Access network 102 may be arranged such that, in response to access network 102 receiving a null data rate request from access terminal 116, processor 206 executes the sixth set of program instructions or the seventh set of program instructions.

Program instructions 312 may include an eighth set of program instructions that cause access network 102 to transition to operate in the first mode. While access network 102 is transitioning to operate in the first mode, access network 102 is able transmit forward-link traffic channel data to access terminal 116 at a non-null data rate. The transmission of this forward-link traffic channel data may have been initiated prior to access network 102 initiating execution of the eighth set of program instructions or after initiating execution of the eighth set of program instructions Program instructions 312 may include a ninth set of program instructions that cause access network 102 to transition to operate in the second mode. While access network 102 is transitioning to operate in the second mode, access network 102 is able transmit forward-link traffic channel data to access terminal 116 at a non-null data rate. The transmission of this forward-link traffic channel data may have been initiated prior to access network 102 initiating execution of the ninth set of program instructions or after initiating execution of the ninth set of program instructions.

Program instructions 312 may include a tenth set of program instructions that cause access network 102 (in particular, e.g., processor 308) to determine an average of the data rate parameter of a given number of non-null data rate requests transmitted from access terminal 116. For purposes of this description, the "determined average" determined by access network 102 will be referred to as a "second determined average." Each non-null data rate request of the given number of non-null data rate requests is received at access network 102 prior to access network 102 receiving a given null data rate request transmitted from access terminal 116. As an example, if the given number of non-null data rate requests equals non-null data rate request threshold 314 (e.g., 5), and if access terminal 116 transmits, consecutively, non-null data rate requests having data rate parameters 8, 8, 9, 5, 6, 4, 3, 1, 1 prior to transmitting a null data rate request, then execution of the tenth set of program instructions cause access network 102 (in particular, e.g., processor 308) to determine the average of 6, 4, 3, 1, and 1, (e.g., (6+4+3+1+ 1)/5=5). Some or all of the instructions of the tenth set of program instructions may be substantially similar or identical to instructions of the second set of program instructions.

Program instructions 312 may include an eleventh set of program instructions that cause processor 308 to determine whether an application being executed at access terminal 116 is the first type of application. At least a portion of the eleventh set of program instructions may be substantially similar or identical to program instructions of the fifth set of program instructions.

If processor 308 determines that the application being executed at access terminal 116 is the first type of application, then processor 308 may responsively execute the eighth set of program instructions so as to cause access terminal 116 to transition to operate in the first mode, and thereafter the sixth set of instructions so as to cause access terminal 116 to operate in the first mode.

If processor 308 determines that the application being executed at access terminal 116 is not the first type of application, then after access network 102 receives the given null data rate request, processor 308 may responsively execute the tenth set of program instructions so as to determine whether the second determined average equals or exceeds the data rate parameter threshold 314. Based on this determination, processor 308 may, in turn, execute the eighth set of program instructions so as to cause access network 102 to transition to operate in the first mode, or the ninth set of program instructions so as to cause access network 102 to transition to operate in the second mode.

3. Exemplary Operation a. Exemplary Operation at an Access Terminal

Figure 4:
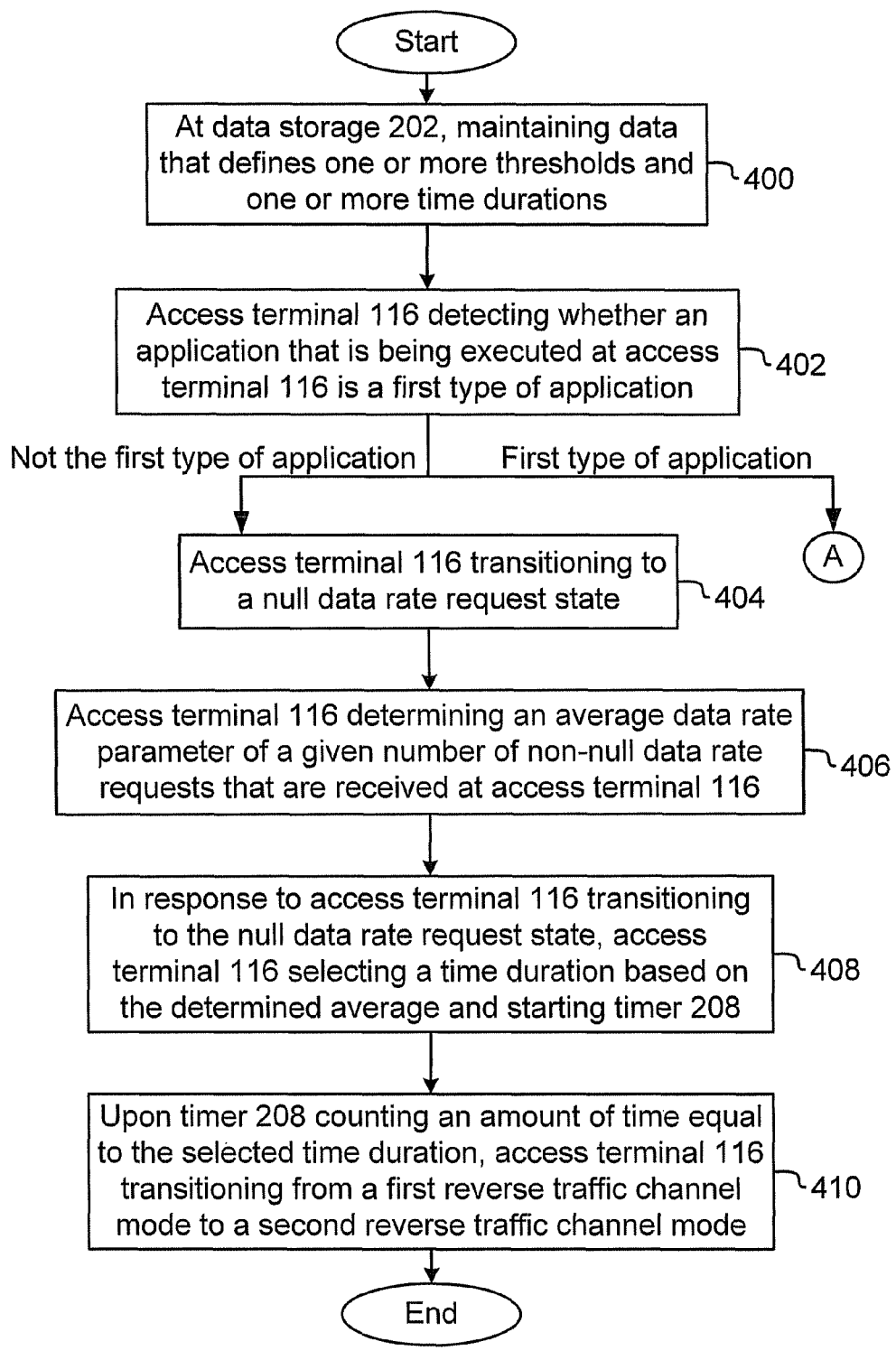
FIGS. 4 and 5 are a flow chart depicting a set of functions that may be carried out in accordance with an exemplary embodiment.
Figure 5:
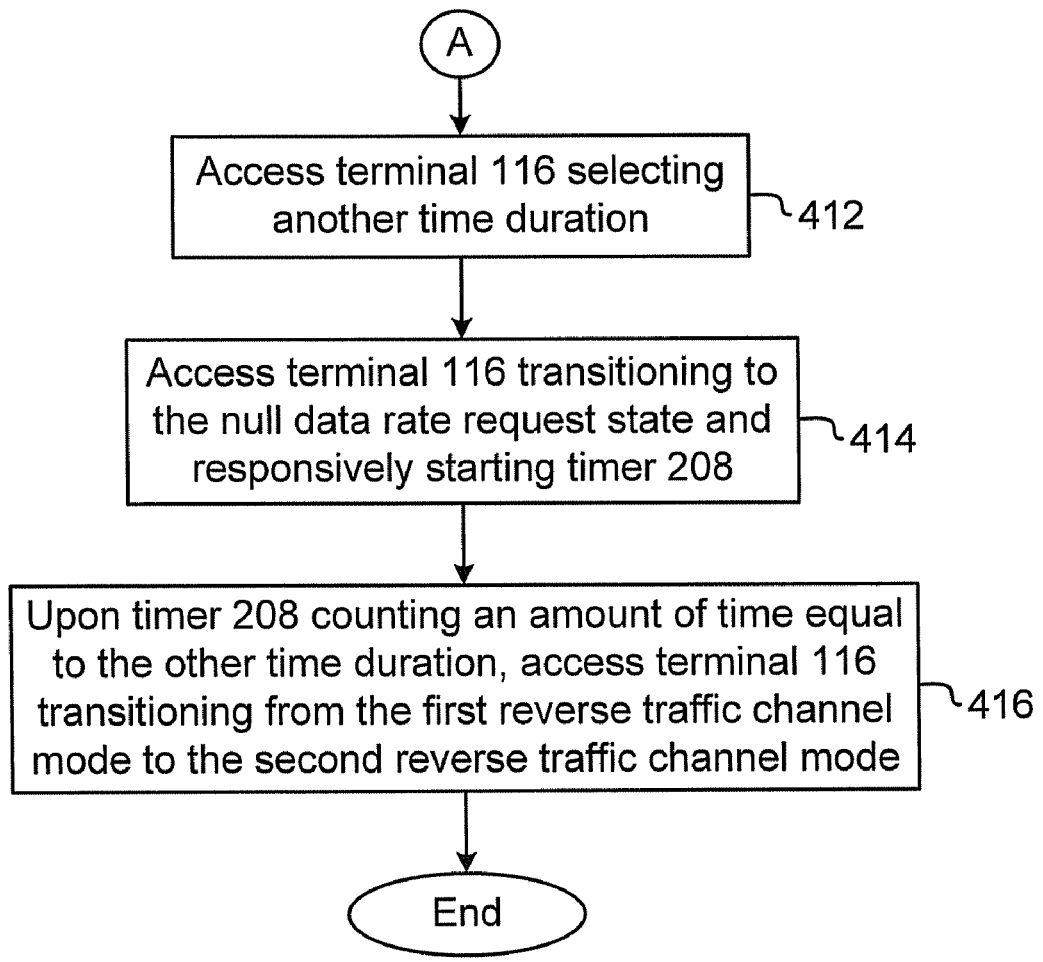

FIGS. 4 and 5 are a flow chart provided to illustrate a set of functions that may be carried out in accordance with an exemplary embodiment. The set of functions illustrated in these figures may be carried out by and/or at access terminal 116. A person having ordinary skill in the art will understand that the functions illustrated in FIGS. 4 and 5 may also be carried out at and/or by one or more other access terminals, such as access terminals 118, 120.

Block 400 includes, at data storage 202, maintaining data that defines one or more thresholds and one or more time durations. As an example, maintaining the data may include maintaining data rate parameter threshold 220 and time durations 228, 232, or maintaining data rate parameters 220, 222 and time durations 228, 230, 232. Other examples of maintaining particular quantities of data rate parameter thresholds and time durations at data storage 202 are also possible.

The one or more thresholds and/or one or more time durations that are maintained at data storage 202 may be thresholds and time durations that have been modified in response to access terminal 116 receiving a request to modify the threshold(s) and/or time duration(s). The requests to modify the threshold(s) and/or time duration(s) may be generated by maintenance device 304 and transmitted to access terminal 116 via transceiver 306. As an example, access terminal 116 may receive a first request to modify data rate parameter threshold 220 and access terminal 116 may responsively modify, and thereafter maintain, data rate parameter threshold 220 to match a threshold defined by the first request. As another example, access terminal 116 may receive a second request to modify time duration 228 and access terminal 116 may responsively modify, and thereafter maintain, time duration 228 to match a threshold defined by the second request. Other examples of modifying the thresholds and/or time durations maintained at data storage 202 are also possible.

Next, block 402 includes access terminal 116 detecting whether an application executing at access terminal 116 is a first type of application. The application being executed at access terminal 116 may be an application of applications 218 and/or an application that generates reverse-link traffic, such as reverse-link traffic channel data and other reverse-link traffic. Detecting whether the application executing at access terminal 116 is the first type of application may include processor 200 executing the fifth set of program instructions described above. In this regard, access terminal 116 may compare a profile identifier associated with an application that is transmitting data to access network 102 with reference profile identifiers 210. The data of reference profile identifiers 210 may indicate whether the application is the first type of application, the second type of application, or another type of application.

If access terminal 116 detects that the application being executed is the first type of application, then the exemplary operation may continue at block 412 of FIG. 5. If access terminal 116 detects that the application being executed is not the first type application, then the exemplary operation may continue at block 404.

Additionally or alternatively, access terminal 116 may detect whether data packets being transmitted from access terminal 116 are data packets generated by an application that is the first type of application, the second type of application, or another type of application. Upon making this detection, the exemplary operation may continue at either block 404 or block 412.

Block 404 includes access terminal 116 transitioning to a null data rate request state.

This transition may occur from a non-null data rate request state in which access terminal 116 transmits non-null data rate requests. Transitioning to the null data rate request state may occur in response to access terminal 116 detecting that it should transmit a null data rate request and/or access terminal 116 transmitting a null data rate request. Transitioning to the null data rate request state may include processor 200 executing the first set of program instructions defined above.

Next, block 406 includes access terminal 116 determining an average data rate parameter of a given number of non-null data rate requests that are received at access terminal 116. As indicated above, this average is referred to as the first determined average. Each non-null data rate request of the given number of non-null data rate requests is transmitted from access terminal 116 prior to access terminal 116 transitioning to the null data rate request state. In this regard, for example, each of the non-null data rate requests may be transmitted while access terminal 116 is operating in a non-null data rate request state. Determining the first determined average may include processor 200 executing the second set of program instructions described above. Upon determining the first determined average, processor 200 may cause the first determined average to be stored at data storage 202.

Access terminal 116 may determine the first determined average under any of a variety of conditions. For example, access terminal 116 may determine the first determined average while operating in a non-null data rate request state (e.g., prior to transitioning to the null data rate request state), while transitioning to the null data rate request, state, and/or while operating in the null data rate request state (e.g., after transitioning to the null data rate request state).

Next, block 408 includes, in response to access terminal 116 transitioning to the null data rate request state, access terminal 116 selecting a time duration based on the determined average (i.e., the first determined average) and starting timer 206. As an example, in an embodiment in which time duration data 214 includes time durations 228, 230, but does not include time duration 232, and threshold data 216 includes data rate parameter threshold 220, but does not include threshold 222, selecting the time duration based on the first determined average may include processor 200 detecting whether the first determined average equals or exceeds data rate parameter threshold 220. If processor 200 detects that the determined average equals or exceeds threshold 220, then selecting the time duration includes selecting the first time duration 228. On the other hand, if processor 200 detects that the first determined average does not equal or exceed threshold 220, then selecting the time duration includes selecting the second time duration 230.

Selecting the time duration may include processor 200 executing the third set of program instructions described above. In this regard, selecting the time duration may depend on how many thresholds are stored in data rate parameter thresholds 314 and how many time durations are stored in time duration data 214. Upon and/or after selecting the time duration, timer 206 may use the selected time duration.

Starting timer 206 may be carried out in various ways. For example, starting timer 206 may include initializing timer 206 to a start time of zero and thereafter triggering timer 206 to begin counting (e.g., incrementing time from the start time of zero). As another example, starting timer 206 may include initializing timer 206 to a start time equal to the selected time duration and thereafter triggering timer 206 to begin counting (e.g., decrementing time from the start time equal to the selected time duration).

Next, block 410 includes, upon timer 206 counting an amount of time equal to the selected time duration, access terminal 116 transitioning from a first reverse traffic channel mode to a second reverse traffic channel mode. In the first reverse traffic channel mode, access terminal 116 allows transmission of reverse-link traffic channel data and other reverse-link traffic from access terminal 116. In the second reverse traffic channel mode, access terminal 116 prevents transmission of the reverse-link traffic channel data but allows transmission other reverse-link traffic from access terminal 116. Transitioning from the first reverse traffic channel mode to the second reverse traffic channel mode may include processor 200 executing the fifth set of program instructions described above.

In addition to preventing transmission of the reverse-link traffic channel data and allowing transmission of the other reverse-link traffic, access terminal 116 may, carry out a variety of other functions while operating in the second reverse traffic channel mode. For example, after access terminal 116 transitions to the second reverse traffic channel mode and while access terminal 116 operates in this mode, access terminal 116 may transmit a plurality of non-null data rate requests without transmitting a null data rate request. In response to transmitting the plurality of non-null data rate requests without transmitting the null data rate request while the access terminal operates in the second reverse traffic channel mode, access terminal 116 may transition to the first reverse traffic channel mode from the second reverse traffic channel mode. As another example, after access terminal 116 transitions to the second reverse traffic channel mode and while access terminal 116 operates in this mode, access terminal 116 may receive a forward traffic channel data packet that is addressed to access terminal 116. In response to receiving the forward traffic channel data packet, access terminal 116 may transition to the first reverse traffic channel mode from the second reverse traffic channel mode.

Next, FIG. 5 illustrates a set of functions that may be carried out if, at block 402 of FIG. 4, access terminal 116 detects that the application being executed is the first type of application. The functions illustrated in FIG. 5 may also be carried out if access terminal 116 determines that data packets being transmitted from access terminal 116 were generated by an application that is the first type of application (e.g., a VoIP application or a PTT application).

Block 412 includes access terminal 116 selecting another time duration. Block 412 may be carried out if access terminal 116 detects that the application executing at access terminal 116 is the first type of application. In an embodiment in which time duration data 214 includes first time duration 228 and second time duration 230, but does not include time duration 232, selecting the other time duration may include selecting a time duration that is greater than the second time duration 230. For example, selecting the time duration may include selecting first time duration 228, or another time duration that is greater than second time duration 230. In an embodiment in which time duration data 214 includes time durations 228, 230, 232, selecting the other time duration may include selecting a time duration that is greater than the third time duration 232. For example, selecting the time duration may include selecting the first time duration 228, the second time duration 230, or another time duration that is greater than the third time duration 232. Selecting the time duration may include processor 200 executing the third set of program instructions described above.

Next, block 414 includes access terminal 116 transitioning to the null data rate request state and responsively starting timer 206. This transition may occur from a non-null data rate request state in which access terminal 116 transmits non-null data rate requests. Transitioning to the null data rate request state may occur in response to access terminal 116 detecting that it should transmit a null data rate request and/or access terminal 116 transmitting a null data rate request. Transitioning to the null data rate request state may include processor 200 executing the first set of program instructions defined above.

As indicated above, starting timer 206 may be carried out in various ways. For example, starting timer 206 may include initializing timer 206 to a start time of zero and thereafter triggering timer 206 to begin counting (e.g., incrementing time from the start time of zero). As another example, starting timer 206 may include initializing timer 206 to a start time equal to the selected time duration and thereafter triggering timer 206 to begin counting (e.g., decrementing time from the start time equal to the selected time duration).

Next, block 416 includes, upon timer 206 counting an amount of time equal to the other time duration, access terminal 116 transitioning from the first reverse traffic channel mode to the second reverse traffic channel mode. While operating in the first reverse traffic channel mode, access terminal 116 allows transmission of reverse-link traffic channel data and other reverse-link traffic from access terminal 116. While operating in the second reverse traffic channel mode, access terminal 116 prevents transmission of the reverse-link traffic channel data but allows transmission of other reverse-link traffic from access terminal 116. Transitioning from the first reverse traffic channel mode to the second reverse traffic channel mode may include processor 200 executing the fourth set of program instructions described above.

b. Exemplary Operation at an Access Network

Figure 6:
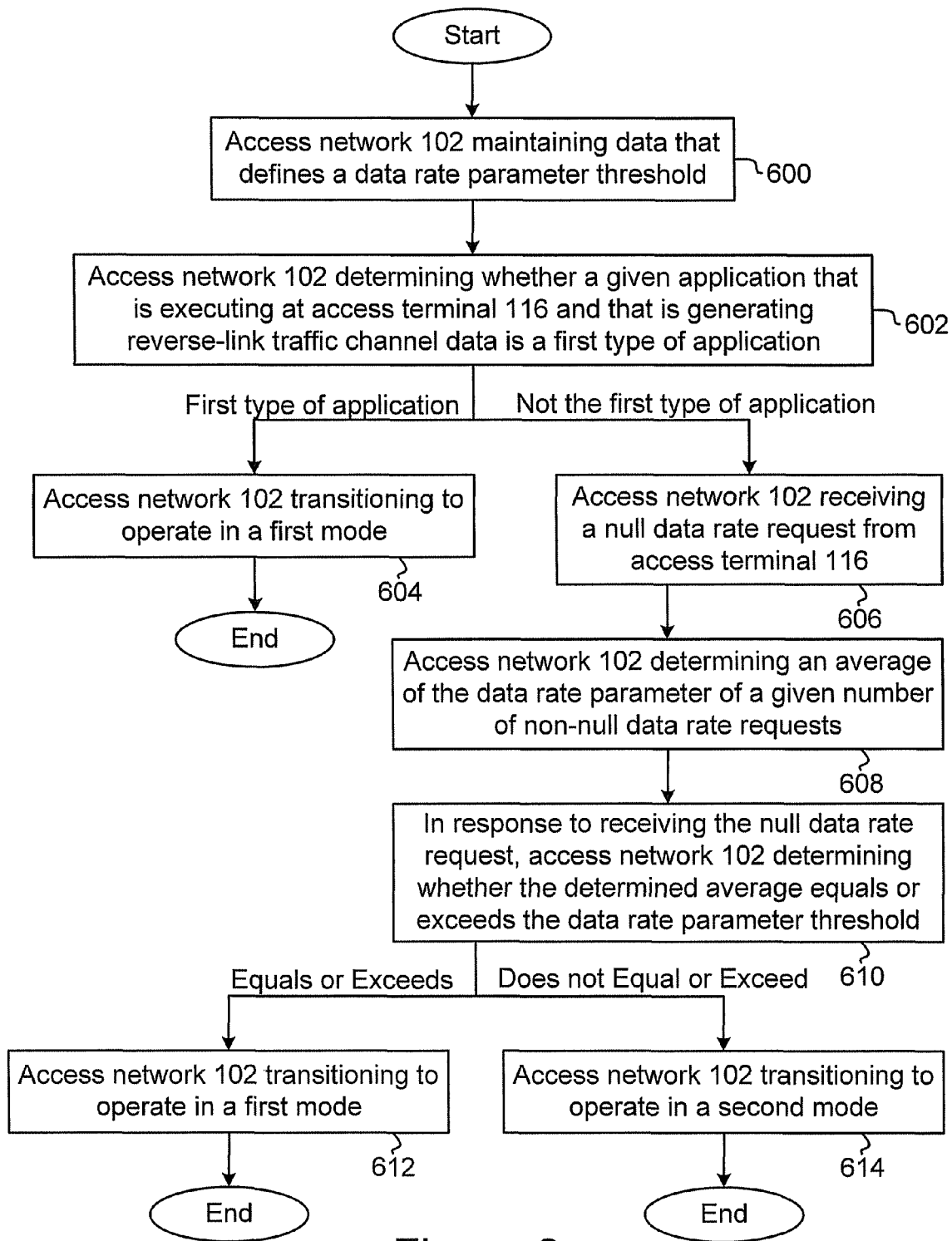
FIG. 6 is a flow chart depicting another set of functions that may be carried out in accordance with an exemplary embodiment.

FIG. 6 is a flow chart provided to illustrate a set of functions that may be carried out in accordance with an exemplary embodiment. One or more of the functions shown in FIG. 6 may be repeated and two or more of the functions or portions of the functions illustrated in FIG. 6 may be carried out simultaneously.

Block 600 includes access network 102 maintaining data that defines a data rate parameter threshold. As an example, access network 102 maintains data rate parameter threshold 314. Maintaining the threshold may include maintaining a default threshold that is stored as data rate parameter threshold 314 while access network 102 is being manufactured. Additionally or alternatively, maintaining the threshold may include maintaining data received in a request to modify data rate parameter threshold 314. Such a request may be received from maintenance device 304.

Next, block 602 includes access network 102 determining whether a given application that is executing at access terminal 116 is a first type of application. The given application may comprise an application that generates reverse-link traffic channel data and other reverse-link data that is to be transmitted across a reverse-link to access network 102. As an example, the first type of application may comprise an application for carrying out voice communications, such as a VoIP application or a PTT application.

Making the determination of block 602 may include access network 102 (i) receiving profile identifiers in packets of data sent from access terminal 116 over the reverse-link and/or from another device, such as PDSN 110, and (ii) comparing the received profile identifiers with at least a portion of the reference profile identifiers 318. In the case in which access network 102 receives profile identifiers from PDSN 110, access terminal 116 may transmit the profile identifiers to access network 102 for transmission, in turn, to PDSN 110. Access terminal 116 may transmit these profile identifiers while it is attempting to establish and/or establishing a communication session via access network 102.

As an example, if access network 102 receives data packets containing profile identifier 0×0100, access network 102 may compare the received profile identifier with the reference profile identifiers 318 so as to determine that the application executing at access terminal 116 and/or causing the data packets to be transmitted to access network 102 is a VoIP application. Additionally or alternatively, by comparing the received profile identifier with the reference profile identifiers 318, access network 102 may determine that the data packets received from access terminal 116 are (i) data packets that are generated by the VoIP application and that contain reverse-link traffic channel data, or (ii) another type of data packets. Making the determination of block 602 may include processor 308 executing the eleventh set of program instructions described above.

Next, block 604 includes access network 102 transitioning to operate in a first mode. The function of block 604 may be carried out if the determination of block 602 is that the given application is the first type of application and/or that the data packets received at access network 102 from access terminal 116 are data packets generated by an application that is the first type of application. Transitioning to operate in the first mode may include access network 102 transitioning to the first mode for access terminal 116, while access network 102 operates in the first mode or the second mode for each of one or more other access terminals (e.g., access terminals 118, 120). Transitioning to operate in the first mode may include processor 308 executing the eighth set of program instructions described above. Upon access network 102 transitioning to operate in the first mode for access terminal 116, in response to receiving a null data rate request from access terminal 116, access network 102 allows transmission of forward-link traffic channel data to access terminal 116 at a non-null data rate.

Next, block 606 includes access network 102 receiving a null data rate request from access terminal 116. Access terminal 116 may transmit the null data rate request in response to detecting that access terminal 116 cannot decode packets that are being transmitted from access network 102 via a forward-link air interface. As an example, access terminal 116 may not be able to decode such packets while access terminal 116 is operating in poor RF conditions. The function of block 606 may be carried out after access network 102 detects that the given application is not the first type of application and/or that the data packets being transmitted to access network 102 from access terminal 116 are data packets being generated by an application that is not the first type of application.

Next, block 608 includes access network 102 determining an average of the data rate parameter of a given number of non-null data rate requests. As indicated above, this average is referred to as the second determined average. Each non-null data rate request of the given number of non-null, data rate requests is received at access network 102 prior to access network 102 receiving the null data rate request (block 606). Determining the second determined average may include processor 308 executing the tenth set of program instructions described above and/or may occur in response to access network 102 receiving the null data rate request. Upon determining the second determined average, processor 308 may cause the second determined average to be stored at data storage 310.

Next, block 610 includes, in response to access network 102 receiving the null data rate request, access network 102 determining whether the determined average (i.e., the second determined average) equals or exceeds the data rate parameter threshold. Making this determination may include processor 308 executing program instructions that cause processor 308 to compare the second determined average to data rate parameter threshold 314.

Next, block 612 includes access network 102 transitioning to operate in the first mode. The function of block 612 may be carried out if the determination of block 610 is that the second determined average equals or exceeds data rate parameter threshold 314. Transitioning to operate in the first mode may include access network 102 transitioning to operate in the first mode for access terminal 116 while access network 102 operates in the first mode or the second mode for each of one or more other access terminals (e.g., access terminals 118, 120). Transitioning to operate in the first mode may include processor 308 executing the eighth set of program instructions described above. Upon access network 102 transitioning to operate in the first mode for access terminal 116, in response to receiving a null data rate request from access terminal 116, access network 102 allows transmission of forward-link traffic channel data to access terminal 116 and from access network 102 at a non-null data rate.

Next, block 614 includes access network 102 transitioning to operate in a second mode. The function of block 614 may be carried out if the determination of block 610 is that the second determined average does not equal or exceed data rate parameter threshold 314. Transitioning to operate in the second mode may include access network 102 transitioning to operate in the second mode for access terminal 116 while access network 102 operates in the first mode or the second mode for each of one or more other access terminals (e.g., access terminals 118, 120). Transitioning to operate in the second mode may include processor 308 executing the ninth set of program instructions described above. Upon access network 102 transitioning to operate in the second mode for access terminal 116, in response to receiving a null data rate request from access terminal 116, access network 102 prevents transmission of forward-link traffic channel data to access terminal 116 from access network 102.

4. Conclusion

Exemplary embodiments have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. At an access terminal that transmits data rate requests, wherein each data rate request includes a data rate parameter indicating whether the data rate request is a null data rate request or a non-null data rate request, and wherein the access terminal includes a timer, a method comprising:

the access terminal transitioning to a null data rate request state;

the access terminal determining an average of the data rate parameter of a given number of non-null data rate requests, wherein each non-null data rate request of the given number of non-null data rate requests is transmitted from the access terminal prior to the access terminal transitioning to the null data rate request state;

in response to the access terminal transitioning to the null data rate request state, the access terminal selecting a time duration based on the determined average and starting the timer, and upon the timer counting an amount of time equal to the selected time duration, the access terminal transitioning from (i) a first reverse traffic channel mode in which the access terminal allows transmission of reverse-link traffic channel data and other reverse-link traffic to (ii) a second reverse traffic channel mode in which the access terminal prevents transmission of the reverse-link traffic channel data but allows transmission of the other reverse-link traffic.

2. The method of claim 1, further comprising:
the access terminal transmitting a null data rate request,
wherein the access terminal transitioning to the null data rate request state occurs in response to the access terminal transmitting the null data rate request.

3. The method of claim 1, further comprising:
the access terminal determining that a null data rate request should be transmitted from the access terminal,
wherein the access terminal transitioning to the null data rate request state occurs in response to the access terminal determining that the null data rate request should be transmitted from the access terminal.

4. The method of claim 1, further comprising:
maintaining data that defines a data rate parameter threshold, a first time duration, and a second time duration,
wherein if the determined average equals or exceeds the data rate parameter threshold, then selecting the time duration includes selecting the first time duration,
wherein if the determined average does not equal or exceed the data rate parameter threshold, then selecting the time duration includes selecting the second time duration, and
wherein the first time duration is greater than the second time duration.

5. The method of claim 4, further comprising:
prior to performing the method of claim 1, the access terminal detecting whether an application executing at the access terminal is a first type of application, wherein the application generates the reverse-link traffic channel data and the other reverse-link traffic;
if the access terminal detects that the application is the first type of application, then (i) the access terminal selecting another time duration, wherein the other time duration is greater than the second time duration, (ii) the access terminal transitioning to the null data rate request state and responsively starting the timer, and (iii) upon the timer counting an amount of time equal to the other time duration, the access terminal transitioning from the first reverse traffic channel mode to the second reverse traffic channel mode; and
if the access terminal detects that the application is not the first type of application, then thereafter performing the method of claim 1.

6. The method of claim 5, wherein selecting the other time duration includes selecting the first time duration as the other time duration.

7. The method of claim 1, further comprising:
maintaining data that defines a first data rate parameter threshold, a second data rate parameter threshold, a first time duration, a second time duration, and a third time duration,
wherein the first data rate parameter threshold is greater than the second data rate parameter threshold,
wherein if the determined average equals or exceeds the first data rate parameter threshold, then selecting the time duration includes selecting the first time duration,
wherein if the determined average does not equal or exceed the first data rate parameter threshold and the determined average data rate is equal to or exceeds the second data rate parameter threshold, then selecting the time duration includes selecting the second time duration,
wherein if the determined average is less than the second data rate parameter threshold, then selecting the time duration includes selecting the third time duration, and
wherein the first time duration is greater than the second time duration and the second time duration is greater than the third time duration.

8. The method of claim 7,
wherein the first data rate parameter threshold and the second data rate parameter threshold are each within a range of 1 to 12, and
wherein the range includes 1 and 12.

9. The method of claim 7, further comprising a function selected from the group consisting of (i) receiving a first request to modify the data that defines the first data rate parameter threshold and responsively modifying the data that defines the first data rate parameter threshold to match a threshold defined by the first request, and (ii) receiving a second request to modify the data that defines the second data rate parameter threshold and responsively modifying the data that defines the second data rate parameter threshold to match a threshold defined by the second request.

10. The method of claim 1 further comprising:
after the access terminal transitions to the second reverse traffic channel mode and during a given period of time while the access terminal operates in the second reverse traffic channel mode, the access terminal transmitting a plurality of non-null data rate requests without transmitting a null data rate request, and
in response to the access terminal transmitting the plurality of non-null data rate requests without transmitting the null data rate request during the given period of time, the access terminal transitioning to the first reverse traffic channel mode.

11. The method of claim 1 further comprising:
after the access terminal transitions to the second reverse traffic channel mode and while the access terminal operates in the second reverse traffic channel mode, the access terminal receiving a forward traffic channel data packet addressed to the access terminal, and
in response to the access terminal receiving the forward traffic channel data packet addressed to the access terminal, the access terminal transitioning to the first reverse traffic channel mode.

12. The method of claim 1, wherein the other reverse-link traffic comprises traffic selected from the group consisting of: (i) pilot channel traffic, (ii) medium access channel traffic, (iii) acknowledgment channel traffic, (iv) auxiliary pilot channel traffic, (v) a reverse rate indicator (RRI), (vi) a data rate request, and (vii) data source control traffic.

13. An access terminal comprising:
a timer;
a transmitter that transmits data rate requests, wherein each data rate request includes a data rate parameter indicating whether the data rate request is a null data rate request or a non-null data rate request;
a processor; and
data storage containing computer-readable program instructions executable by the processor,
wherein the program instructions include instructions that cause the access terminal to (i) transition to a null data rate request state, (ii) determine an average of the data rate parameter of a given number of non-null data rate requests, wherein each non-null data rate request of the given number of non-null data rate requests is transmitted from the access terminal prior to the transition to the null data rate request state, (iii) in response to the transition to the null data rate request state, select a time duration based on the determined average and start the timer, and (iv) upon the timer counting an amount of time equal to the selected time duration, transition from a first reverse traffic channel mode in which the access terminal allows transmission of reverse-link traffic channel data and other reverse-link traffic to a second reverse traffic channel mode in which the access terminal prevents transmission of the reverse-link traffic channel data but allows transmission of the other reverse-link traffic.

14. The access terminal of claim 13,
wherein the data storage further contains data that defines a data rate parameter threshold, a first time duration, and a second time duration,
wherein the program instructions further include instructions that cause the processor to detect whether the determined average equals or exceeds the data rate parameter threshold,
wherein if processor detects that the determined average equals or exceeds the data rate parameter threshold, then selection of the time duration includes selection of the first time duration,
wherein if the processor detects that the determined average does not equal or exceed the data rate parameter threshold, then selection of the time duration includes selection of the second time duration, and
wherein the first time duration is greater than the second time duration.

15. The access terminal of claim 13,
wherein the data storage further contains data that defines a first data rate parameter threshold, a second data rate parameter threshold, a first time duration, a second time duration, and a third time duration,
wherein the first data rate parameter threshold is greater than the second data rate parameter threshold,
wherein the program instructions further include instructions that cause the processor to detect whether the determined average equals or exceeds the first data rate parameter threshold and instructions to detect whether the determined average equals or exceeds the second data rate parameter threshold,
wherein if the processor detects that the determined average equals or exceeds the first data rate parameter threshold, then selection of the time duration includes selection of the first time duration,
wherein if the processor detects that the determined average does not equal or exceed the first data rate parameter threshold and that the determined average equals or exceeds the second data rate parameter threshold, then selection of the time duration includes selection of the second time duration,
wherein if the processor detects that the determined average does not equal or exceed the second data rate parameter threshold, then selection of the time duration includes selection of the third time duration, and
wherein the first time duration is greater than the second time duration and the second time duration is greater than the third time duration.

16. At an access network that receives data rate requests and reverse-link traffic channel data from a given access terminal, wherein each of the received data rate requests includes a data rate parameter indicating whether the data rate request is a null data rate request or a non-null data rate request, and wherein the access network is operable in (i) a first mode in which, in response to receiving a null data rate request from the given access terminal, the access network allows transmission of forward-link traffic channel data to the given access terminal at a non-null data rate, and (ii) a second mode in which, in response to receiving a null data rate request from the given access terminal, the access network prevents transmission of forward-link traffic channel data to the given access terminal, a method comprising:
the access network maintaining data that defines a data rate parameter threshold;
the access network determining whether a given application that is executing at the given access terminal is a first type of application;
wherein if the access network determines that the given application is the first type of application, then the method further comprises the access terminal transitioning to operate in the first mode, and
wherein if the access network determines that the given application is not the first type of application, then the method further comprises:
the access network receiving a null data rate request from the given access terminal;
the access network determining an average of the data rate parameter of a given number of non-null data rate requests, wherein each non-null data rate request of the given number of non-null data rate requests is received at the access network from the given access terminal prior to the access network receiving the null data rate request; and
in response to the access network receiving the null data rate request, the access network determining whether the determined average equals or exceeds the data rate parameter threshold, wherein if the access network determines that the determined average equals or exceeds the data rate parameter threshold, then the access network responsively transitioning to operate in the first mode, and wherein if the access network determines that the determined average does not equal or exceed the data rate parameter threshold, then the access network responsively transitioning to operate in the second mode.

17. The method of claim 16, wherein the first type of application is selected from the group consisting of (i) a Voice over Internet Protocol (VoIP) application, and (ii) a push-to-talk (PTT) application.

18. The method of claim 17, wherein if the application is not the first type of application, then the application is a second type of application comprising a best-effort application.

19. The method of claim 16, further comprising:
the access network maintaining reference profile identifier data, wherein the reference profile identifier data comprises a plurality of profile identifiers and, for each profile identifier of the plurality of profile identifiers, data that indicates whether that profile identifier is associated with an application that is the first type of application; and
the access network receiving a given profile identifier that is associated with the given application,
wherein the given access terminal transmits the given profile identifier to the access network while the given access terminal is establishing a communication session via the access network, and
wherein the access network determining whether the given application is the first type of application includes the access network comparing the given profile identifier to at least a portion of the reference profile identifier data.

20. The method of claim 16,
wherein while the access network is transitioning to operate in the first mode, the access network is able to transmit forward-link traffic channel data to the given access terminal at a non-null data rate, and wherein while the access network is transitioning to operate in the second mode, the access network is able to transmit forward-link traffic channel data to the given access terminal at a non-null data rate.

21. An access network that receives data rate requests and reverse-link traffic channel data from a given access terminal, wherein each of the received data rate requests includes a data rate parameter indicating whether the data rate request is a null data rate request or a non-null data rate request, and wherein the access network is operable in (i) a first mode in which, in response to receiving a null data rate request from the given access terminal, the access network allows transmission of forward-link traffic channel data to the given access terminal at a non-null data rate, and (ii) a second mode in which, in response to receiving a null data rate request from the given access terminal, the access network prevents transmission of forward-link traffic channel data to the given access terminal, the access network comprising:

a processor; and data storage containing (i) data that defines a data rate parameter threshold, and (ii) computer-readable program instructions that are executable by the processor, wherein the program instructions include (i) instructions that cause the processor to determine whether an application being executed at the given access terminal is a first type of application, (ii) instructions that cause the processor to determine an average of the data parameter of a given number of non-null data rate requests, wherein each non-null data rate request of the given number of non-null data rate requests is received at the access network from the given access terminal prior to reception of a given null data rate request that is transmitted to the access network from the given access terminal, (iii) a first set of transition instructions that cause the access network to transition to operate in the first mode, and (iv) a second set of transition instructions that cause the access network to transition to operate in the second mode, wherein if the processor determines that the application is the first type of application, then the processor executes the first set of transition instructions so as to cause the access terminal to operate in the first mode, wherein if the processor determines that the application is not the first type of application, then after the access network's reception of the given null data rate request, the processor executes program instructions to determine whether the determined average equals or exceeds the data rate parameter threshold, wherein if the processor determines that the determined average equals or exceeds the data rate parameter threshold, then the processor responsively executes the first set of transition instructions so as to cause the access network to transition to operate in the first mode, and wherein if the processor determines that the determined average does not equal or exceed the data rate parameter threshold, then the processor responsively executes the second set of transition instructions so as to cause the access network to transition to operate in the second mode.

22. The access network of claim 21, wherein the data storage further contains a user-selectable data value that defines how many non-null data rate requests are within the given number of non-null data rate requests.

23. The access network of claim 21, wherein the first type of application is selected from the group consisting of (i) a Voice over Internet Protocol (VoIP) application, and (ii) a push-to-talk (PTT) application.

24. The access network of claim 23, wherein if the processor determines that the application is not the first type of application, then the application is a second type of application comprising a best-effort application.

* * * * *